C. B. & C. W. GARTRELL.
CAMERA.
APPLICATION FILED SEPT. 2, 1914.
1,159,580.
Patented Nov. 9, 1915.
2 SHEETS—SHEET 2.
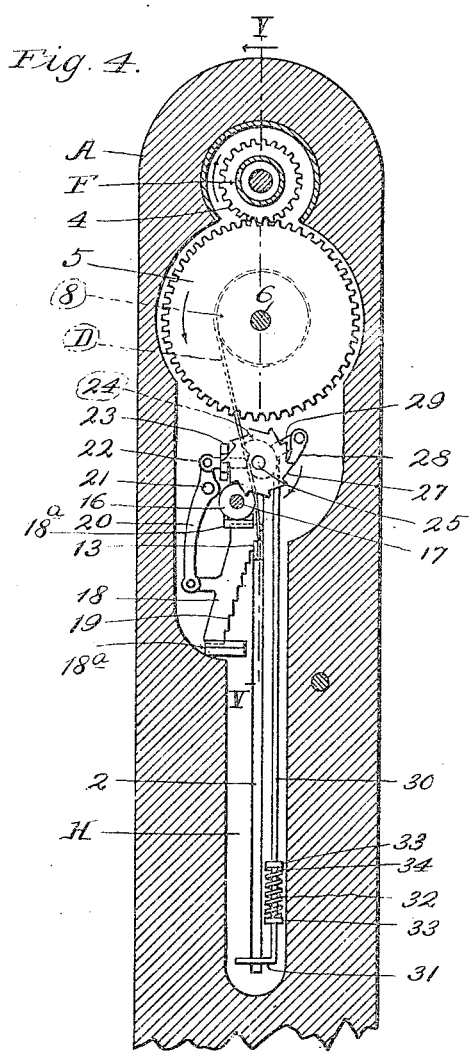
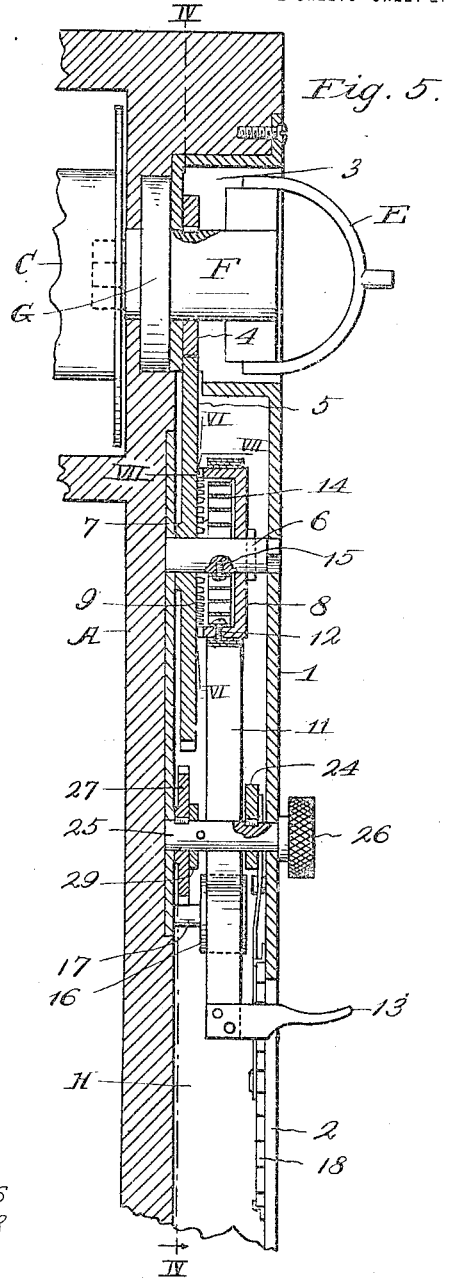
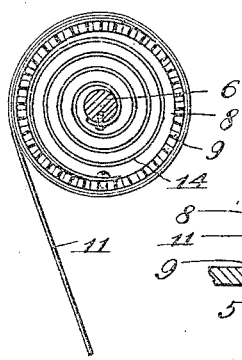
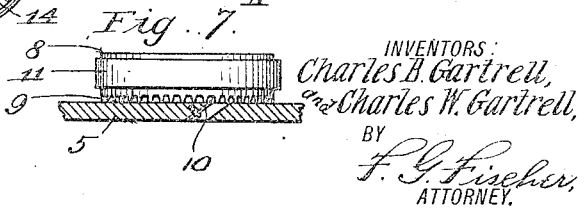
INVENTORS:
Charles B. Gartrell,
Charles W. Gartrell,
BY
F. G. Fischer,
ATTORNEY.
WITNESSES:

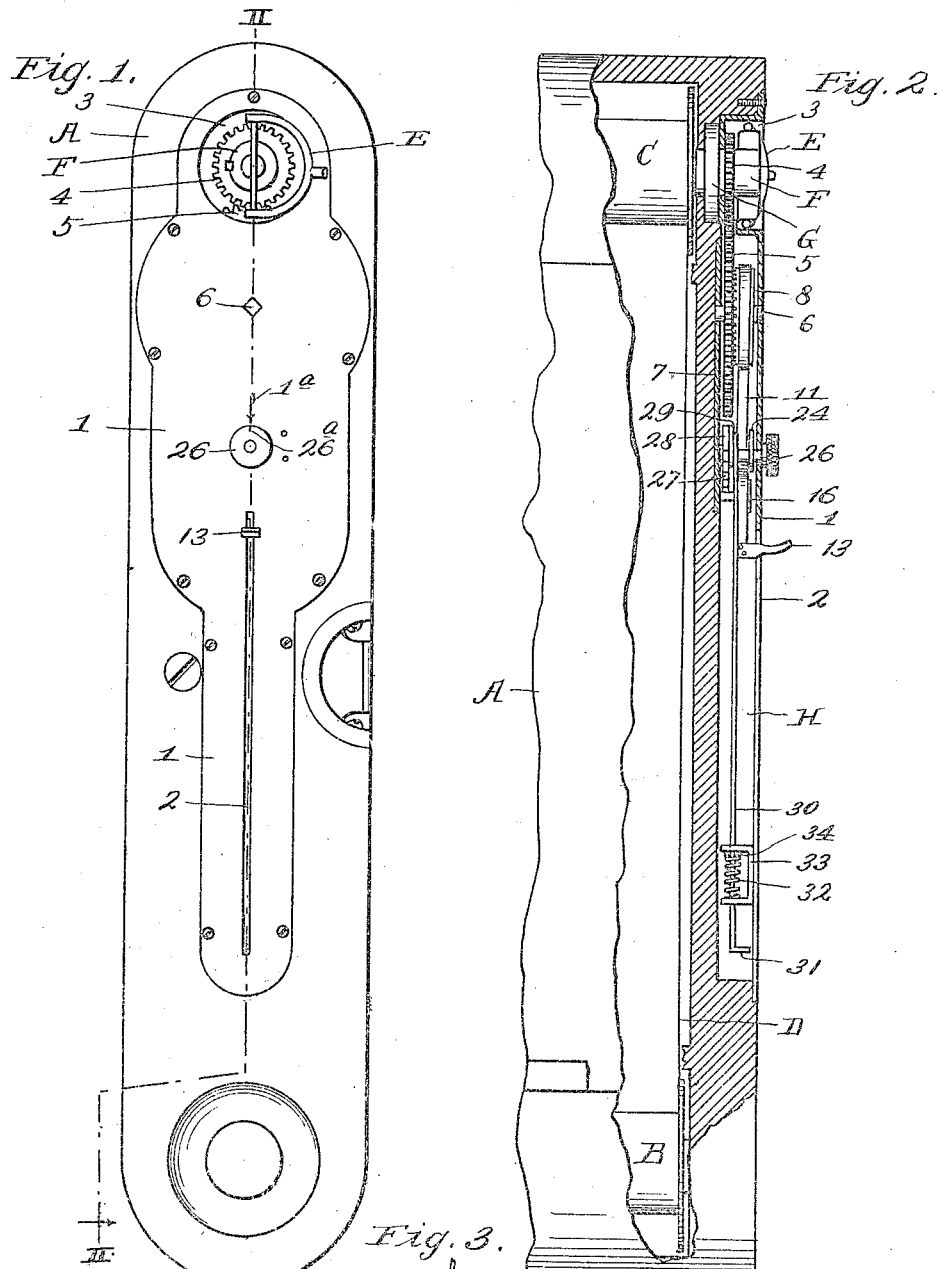

UNITED STATES PATENT OFFICE.

CHARLES B. GARTRELL AND CHARLES W. GARTRELL, OF KANSAS CITY, MISSOURI.

CAMERA.

1,159,580.

Specification of Letters Patent.

Patented Nov. 9, 1915.

Application filed September 2, 1914. Serial No. 859,777.

*To all whom it may concern:*

Be it known that we, CHARLES B. GARTRELL and CHARLES W. GARTRELL, citizens of the United States, residing at Kansas City, in the county of Jackson and State of Missouri, have invented certain new and useful Improvements in Cameras, of which the following is a specification.

Our invention relates to improvements in cameras, and pertains more particularly to means whereby photographic films may be instantly and accurately fed into position for exposure, to the end that consecutive pictures may be taken much more quickly than heretofore.

The invention embodies mechanism whereby each forward movement of the hand results in the accurate feeding of just the proper length of film for taking a picture. Hence, waste of films by underfeeding or overfeeding is overcome.

In order that the invention may be fully understood, reference will now be made to the accompanying drawings, in which:

Figure 1 is a side elevation of a camera provided with our invention. Fig. 2 is a broken rear elevation, partly in section, on line II—II of Fig. 1. Fig. 3 is a broken elevation, partly in section, of part of a compensating mechanism forming an important feature of the invention. Fig. 4 is a section, enlarged, on line IV—IV of Fig. 5. Fig. 5 is a section further enlarged, on the plane of line V—V of Fig. 4. Fig. 6 is a section of part of the film winding mechanism, taken on line VI—VI of Fig. 5. Fig. 7 is a horizontal section on line VII—VII of Fig. 5, of some of the parts disclosed by Fig. 6.

A designates a camera in one side of which our improvement may be constructed at the time of making the camera or it may be applied as an attachment, as found most convenient. Said camera is provided with the customary spools B and C, the former of which is initially provided with the film D.

E designates the handle whereby the winding spool C is usually rotated to intermittently unwind the film D from the spool B, in proper lengths for taking pictures. The handle E is mounted upon a shaft F journaled in a circular stationary casing G, containing the usual mechanism (not shown) to prevent said shaft F from turning backward and unwinding the film from the spool C. In the present instance, we have shown one side of the camera A provided with a recess H to receive our mechanism, said recess being covered by a face plate 1, having a longitudinal slot 2 extending upwardly from a point near its lower end to approximately its middle portion. The face-plate 1 also has a circular recess 3 near its upper end to receive the handle E and the shaft F.

4 designates a pinion geared to the shaft F and intermeshing with a large gear wheel 5, journaled upon a stationary shaft 6, carried by the face-plate 1 and an inner plate 7.

8 designates a barrel loosely-mounted upon the shaft 6 beside the gear wheel 5 and provided with a circular row of gear teeth 9, to engage a spring detent 10, fixed to said gear wheel 5, so that the latter may be rotated in one direction by the teeth 9.

11 designates a tape, preferably made of steel, and secured at one end by a pin or screw 12 to the periphery of the barrel 8, upon which the greater portion of the tape is adapted to wind, see Fig. 5. The opposite end of the tape 11 is provided with a handle 13 projecting outwardly through the slot 2, in which it is adapted to move upwardly and downwardly.

14 designates a spiral spring arranged within the barrel 8, to which its outer end is secured by the pin or screw 12, the inner end of said spring being secured to the stationary shaft 6 by a pin or screw 15. In its passage from the barrel 8 to the handle 13, the tape 11 runs over a guide pulley 16, mounted upon a stub shaft 17, projecting laterally from the inner plate 7.

The pulling forward or downward of the handle 13 results in rotating the spool C just sufficiently to unwind enough of the film D from the spool B for taking one picture, but as the unwinding of successive picture lengths increases the diameter of the roll of film on the spool C, it is obvious that compensating means must be employed to reduce each successive downward stroke of the handle in proportion to the increasing diameter of said roll, to accomplish the feeding of uniform picture lengths. In constructing such compensating mechanism, we employ a ratchet-bar 18, provided with a row of teeth 19 slightly increasing in length from the upper to the lower tooth (Fig. 4). The teeth 19 are consecutively thrown into the path of the handle 13 to shorten each return stroke thereof, so that its forward or downward strokes will be correspondingly shortened and thus compensate for the increasing diameter of the roll being wound upon the spool C.

The ratchet-bar 18 is mounted in a pair of guides 18ª and moved toward the handle 13 the distance of the horizontal width of a tooth 19, on each downward stroke of the handle 13, by a lever 20 fulcrumed upon a pin 21. Lever 20 is pivoted at its ends to the ratchet-bar 18 and a pin 22, which latter extends through a guide 23 and bears against the face of a cam 24. The cam 24 is fixedly-mounted upon a shaft 25 journaled in the plates 1 and 7 and provided at its outer end with a knurled wheel 26, whereby said cam may be instantly adjusted into proper relation with the pin 22 for each roll of films. The cam 24 and its shaft 25 are rotated step by step, by a ratchet-wheel 27 fixed upon said shaft 25. Each step of the ratchet-wheel 27 rotates the cam 24 sufficiently to cause its increasing periphery to force the pin 23 backward enough to have the lever 20 force the ratchet-bar 18 toward the handle 13 the distance of the horizontal width of a tooth 19.

The ratchet-wheel 27 is rotated step by step as above described, through the intermediacy of a pawl 28, pivotally mounted upon an arm 29, pivoted upon the shaft 25 and pivotally connected to the upper end of a rod 30 paralleling the slot 2, across which its lower end 31 is bent to be contacted by the handle 13 and forced downward thereby the space of one tooth of the ratchet-wheel 27. When the handle 13 moves upward and releases the end 31, the rod 30 is moved up by a spring 32 to carry the pawl 28 into engagement with the succeeding tooth of the ratchet wheel 27. The lower end of the spring 32 bears against the adjacent end of a guide 33, and its upper end against a stop pin 34 secured to the rod 30. The stop pin 34 is adapted to strike the upper end of the guide 33, and thus limit the upward movement of said rod 30.

In practice, when the free end of the film roll upon the spool B is attached to the roll C, the handle E is rotated in the usual manner to bring the first picture length of film into position for exposure. The cam 24 is then adjusted to initial position (Fig. 4) to bring the upper tooth 19 of the ratchet-bar 18 into engagement with the handle 13, by rotating the wheel 26 until the mark 26ª thereon registers with the arrow 1ª upon the face-plate 1. After the first picture length of film has been exposed it is wound upon the spool C and the following picture length brought into position for exposure by moving the handle 13 to the lower end of its stroke. As the handle 13 approaches the lower end of its stroke it contacts the end 31 and forces the rod 30 downward, causing it to rotate the cam 24 one step through the intermediacy of the ratchet-wheel 27 and the pawl 28. The movement of the cam 24 moves the ratchet-bar 18 through the intermediacy of the pin 22 and the lever 20, one step toward the handle 13. Hence, when the latter moves upward it engages the second tooth 19, thereby insuring the shortening of the following downward stroke of the handle enough to compensate for the increasing diameter of the roll upon the spool C. This shortening of the stroke automatically continues with each succeeding picture length of film until the entire film has been exposed. On each downward movement of the handle 13 the tape 11 unwinds from the barrel 8 and rotates the same, so that it in turn, through the intermediacy of the gears 4 and 5, rotates the spool C, causing it to wind the film D thereon. When the handle 13 is permitted to move upward after reaching the end of its downward stroke, the barrel 8 is rotated in a reverse direction by the spiral spring 14 and winds up the tape 11. As the barrel 8 rotates in said reverse direction, its teeth 9 press the detent 10 out of their path, so that the gear wheels 4 and 5 remain stationary with the shaft F, which, as before stated, is held from backward rotation by the usual ratchet mechanism within the casing G.

From the foregoing description it will be understood that we have produced means whereby consecutive picture lengths of a film may be rapidly and accurately brought into position for exposure, and thus avoid the tedious operation of performing this function by intermittently rotating the handle E, which often results in spoiling more or less film by rotating said handle either too far, or not far enough to bring the picture lengths into proper position for exposure.

Having thus described our invention what we claim and desire to secure by Letters Patent, is:

1. In combination with a camera having a film winding spool, of gear wheels for rotating said spool to expose successively picture lengths of the film, a barrel to rotate said gear wheels in one direction, a tape to intermittently rotate said barrel in one direction, resilient means to rotate the barrel in a reverse direction after each operation thereof by said tape, and automatic means to successively shorten the movements of said tape, to compensate for the increase in diameter of the roll of film being wound upon the winding spool.

2. In combination with a camera having a film winding spool, of gear wheels for rotating said spool to expose successive picture lengths of the film, a barrel to rotate said gear wheels in one direction, means carried by the wheels and said barrel whereby the latter rotates the former in one direction, a flexible member to intermittently rotate said barrel in one direction, a spring to rotate the barrel in a reverse direction after each operation thereof by said flexible member, and automatic means to successively shorten the movements of said flexible member, to compensate for the increasing diameter of the roll of film being wound upon the spool.

3. In combination with a camera having a film winding spool, of manually-operated means for intermittently rotating said spool to expose successive picture lengths of the film, a toothed-bar to successively shorten the movements of said manually-operated means, to compensate for the increase in diameter of the roll of film being wound upon the winding spool, a cam operably-connected to said toothed-bar to force the successive teeth thereof into engagement with the manually-operated means, and means controlled by the manually-operated means to rotate said cam step by step.

4. In combination with a camera having a film winding spool, of manually-operated means for intermittently rotating said spool to expose successive picture lengths of the film, a ratchet-bar to successively shorten the movements of said manually-operated means, to compensate for the increase in diameter of the roll of film being wound upon the spool, a lever for actuating said ratchet-bar, a pin for actuating said lever, a cam for actuating said pin, and means controlled by the manually-operated means to rotate said cam step by step.

5. In combination with a camera having a film winding spool, of manually-operated means for intermittently rotating said spool to expose successive picture lengths of the film, cam-controlled means to successively shorten the movements of said manually-operated means, to compensate for the increase in diameter of the roll of film being wound upon the spool, a ratchet wheel to rotate the cam step by step, a pawl to actuate said ratchet wheel, and means controlled by the manually-operated means to intermittently actuate said pawl.

6. In combination with a camera having a film winding spool, of manually-operated means for intermittently rotating said spool to expose successive picture lengths of the film, ratchet-controlled means to successively shorten the movements of said manually-operated means, to compensate for the increase in diameter of the roll of film being wound upon the winding spool, and a rod actuated by the manually-controlled means and connected to said ratchet-controlled means to operate the same.

7. In combination with a camera having a film winding spool, of manually-operated means for intermittently rotating said spool to expose successive picture lengths of the film, gearing to successively shorten the movements of said manually-operated means, to compensate for the increasing diameter of the roll of film being wound upon the spool, a rod actuated by the manually-controlled means in one direction and operably-connected to said gearing, and resilient means to move said rod in an opposite direction.

In testimony whereof we affix our signatures, in the presence of two witnesses.

CHARLES B. GARTRELL.
CHARLES W. GARTRELL.

Witnesses:
F. G. FISCHER,
L. J. FISCHER.